March 12, 1957
A. E. JOHNSON
2,785,337
ARC WELDING APPARATUS
Filed Dec. 12, 1951
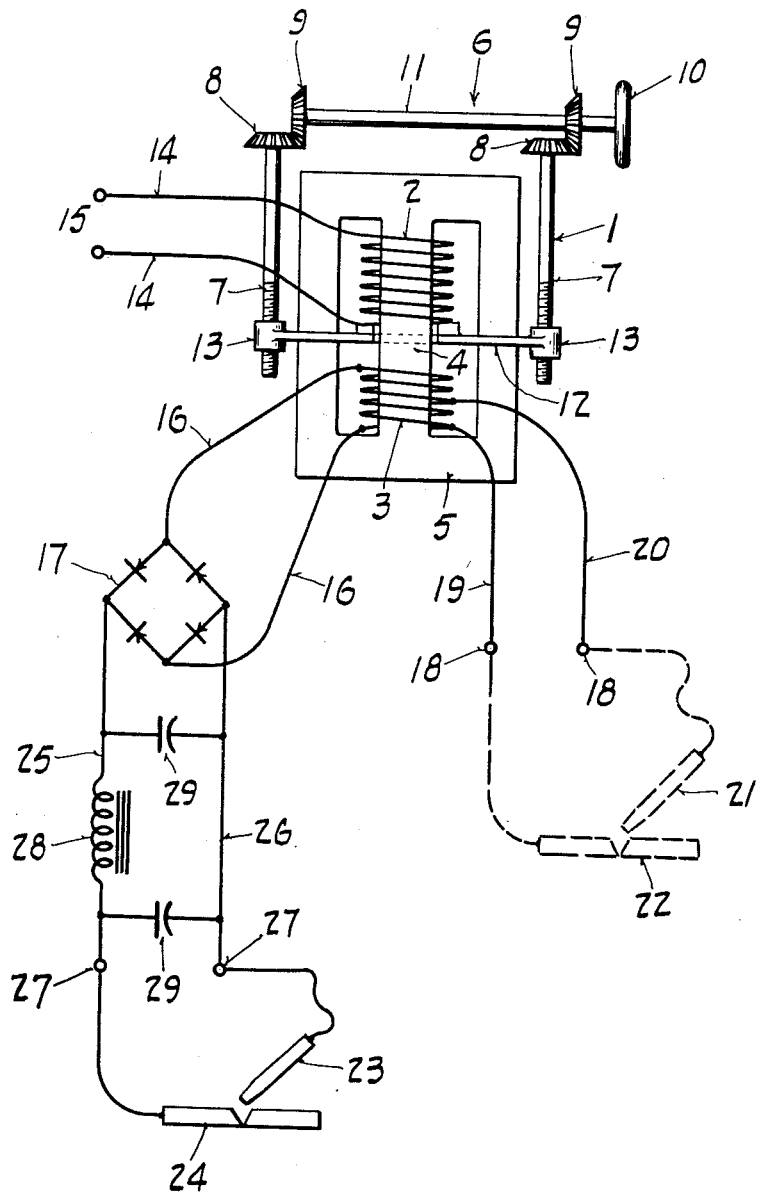
INVENTOR.
*Arthur E. Johnson*
BY
*Andrus & Sceales*
ATTORNEYS.

United States Patent Office 2,785,337
Patented Mar. 12, 1957

2,785,337

ARC WELDING APPARATUS

Arthur E. Johnson, Milwaukee, Wis., assignor to A. O. Smith Corporation, Milwaukee, Wis., a corporation of New York Application December 12, 1951, Serial No. 261,235

2 Claims. (Cl. 315—182)

This invention relates to arc welding apparatus, and particularly to a welder adapted to deliver either direct or alternating current to an arc welding electrode and to the work to be welded.

An object of the invention is to provide an arc welder having but a single movable primary transformer for regulation of the voltages in both a direct current output circuit and an alternating current output circuit.

Another object is to provide a simple and economical apparatus constructed to convert a single phase alternating current input into a relatively smooth direct current output, and to provide the desired voltages across the direct and alternating current output terminals of the welder.

The apparatus, in general, comprises a transformer having a movable primary winding connected to a source of single phase alternating current, and a stationary secondary winding connected to a bridge type selenium rectifier and to a pair of alternating current output terminals. Means are provided to move the primary winding relative to the secondary winding and thereby regulate the voltage across the alternating current output terminals and also across a pair of direct current output terminals, the latter being connected to the rectifier via an inductance-capacitance smoothing circuit.

Other objects and advantages of the invention will be set forth more fully in the following description of the embodiment of the invention illustrated in the accompanying schematic diagram.

Referring to the drawing, the welding apparatus includes a single phase movable primary transformer 1 having a primary winding 2 and a secondary winding 3, both of which are mounted around the vertical center leg 4 of a three-legged transformer core 5. The secondary winding 3 is rigidly mounted at the lower end of the leg 4 and the movable primary winding 2 is mounted at the upper portion thereof, the leg being sufficiently long to permit movement of the primary winding 2 therealong for variation of the amount of voltage induced into the secondary winding.

In order to effect such movement of the primary winding 2 to vary the output of the secondary winding, a handwheel and gear means 6 is suitably mounted on the welder frame, not shown. The means 6 comprises a pair of vertically disposed screw members 7 which are journalled on opposite sides of the core 5 and have bevel gears 8 at the upper ends thereof. The bevel gears 8 are turned by corresponding meshing bevel gears 9 which may be manually rotated by a handwheel 10 acting through a horizontal shaft 11. Upon turning of the handwheel 10 and consequently of the screw members 7, a frame member 12, on which the primary winding 2 is mounted, moves upwardly or downwardly due to the actuation of nut portions 13 of the frame by screw members 7.

Referring now to the electrical circuits of the welding apparatus, the primary winding 2 is connected via a pair of wires or leads 14 to a suitable source 15 of single phase alternating current. In addition, the secondary winding 3 is connected at its ends to a pair of wires 16 leading to the input terminals of a bridge-type full wave rectifier 17, preferably of the selenium variety. The full voltage induced into the secondary winding 3 by the movable primary winding 2 is thus impressed across the rectifier 17 and employed to deliver a direct current output as will subsequently be described.

As contrasted with the case of the rectifier 17, only a part of the secondary winding voltage is delivered to a pair of alternating current output terminals 18 by two leads 19 and 20, the latter of which is tapped into the secondary winding 3 intermediate the ends thereof and the former of which is connected to one end of the secondary winding. The terminals 18, which normally comprise sockets mounted in the casing of the welding apparatus, may be employed to deliver alternating welding current to an arc welding electrode 21 and to work 22.

To deliver direct welding current to an additional or substitute welding electrode 23 and work 24, two leads 25 and 26 are connected, respectively, between the rectifier output terminals and a pair of direct current output terminals 27 of the welder. The flow of direct welding current is made relatively smooth by a suitable inductance coil 28 interposed in the wire 25, and by a pair of capacitors 29 which are paralleled between the leads 25 and 26 on opposite sides of coil 28.

In the operation of the welder, the electrode 21 and work 22 may be connected to the alternating current output terminals 18, or the electrode 23 and work 24 may be connected to the direct current output terminals 27. If desired, the respective alternating and direct current output terminals 18 and 27 may be simultaneously used for both alternating and direct current welding. The input wires 14 are then connected to the single phase alternating current source 15 and the handwheel 10 is rotated to turn the vertical screw members 7 for shifting of the frame 12 and primary winding 2 along transformer leg 4. The desired welding voltages are thus produced across the alternating current terminals 18 and the direct current terminals 27, with the connection of the alternating current output terminals 18 across only a part of the secondary winding 3 serving to make the alternating current open circuit output voltage substantially the same as the direct current open circuit output voltage in spite of the losses in the rectifier 17 and in the inductance-capacitance smoothing circuit. During welding, the alternating current ouput, as well as the direct current output which is supplied from secondary winding 3, rectified in the rectifier 17 and made relatively smooth by the elements 28 and 29, may be varied by merely rotating the handwheel 10.

The invention provides an extremely simple and rugged welding apparatus which may be employed for a variety of welding uses and may be connected to an easily obtainable source of single phase alternating current.

Various embodiments of the invention may be employed within the scope of the following claims.

I claim:

1. In combination with a first and a second arc welding electrode and a first and a second workpiece, a transformer core, a primary winding movably mounted on said core and connected to a source of single phase alternating current, a secondary winding mounted on said core, a bridge type selenium rectifier, a first pair of wires connecting the input terminals of said rectifier to the ends of said secondary winding, a circuit connected to the output terminals of said rectifier for supply of direct current to the first arc welding electrode and to the first workpiece to be welded, said circuit including a series connected inductance coil and a parallel connected capacitor for smoothing of the direct current supply of said electrode and to said work, a second pair of wires connected to said secondary winding for supply of alternating current to the second arc welding electrode and to the second workpiece to be welded, at least one of said second pair of wires being connected to said secondary winding at a point intermediate the ends thereof, and means to move said primary winding relative to said core and thereby regulate both the direct current and alternating current outputs of the apparatus.

2. In combination with a first and a second welding electrode and a first and a second workpiece, a transformer core, a primary winding mounted on said core and connected to a source of single phase alternating current, a secondary winding mounted on said core, a rectifier connected across the ends of the secondary winding, the first electrode and the first workpiece being connected in circuit with the output of the rectifier to effect direct current welding of the first workpiece, the second electrode and the second workpiece being connected across only a portion of said secondary winding to effect alternating current welding of the second workpiece and so that the alternating current open circuit output voltage is substantially the same as the direct current open circuit output voltage, and means to move one of said windings relative to the other winding to regulate both current outputs of said secondary winding.

References Cited in the file of this patent

UNITED STATES PATENTS

| | | |
|---|---|---|
| 1,493,849 | Eschholz et al. | May 13, 1924 |
| 1,368,507 | Kjekstad | Feb. 15, 1927 |
| 1,925,224 | Alder | Sept. 5, 1933 |
| 1,986,939 | Mendelsohn | Jan. 8, 1935 |
| 2,025,207 | Holslag | Dec. 24, 1935 |
| 2,509,380 | Walker | May 30, 1950 |

FOREIGN PATENTS

| | | |
|---|---|---|
| 121,772 | Australia | Aug. 1, 1946 |